US009301127B2

(12) United States Patent
McCann et al.

(10) Patent No.: US 9,301,127 B2
(45) Date of Patent: Mar. 29, 2016

(54) PERSISTENT NETWORK NEGOTIATION FOR PEER TO PEER DEVICES

(71) Applicant: BlackBerry Limited, Waterloo (CA)

(72) Inventors: Stephen McCann, Southampton (GB);
Michael Peter Montemurro, Toronto (CA); James Randolph Winter Lepp, Ottawa (CA); David Philip Hole, Southhampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 373 days.

(21) Appl. No.: 13/836,759

(22) Filed: Mar. 15, 2013

(65) Prior Publication Data

US 2014/0223019 A1    Aug. 7, 2014

Related U.S. Application Data

(60) Provisional application No. 61/761,576, filed on Feb. 6, 2013.

(51) Int. Cl.
| *G06F 15/16* | (2006.01) |
| *H04W 8/18* | (2009.01) |
| *H04L 29/06* | (2006.01) |
| *G06F 12/00* | (2006.01) |
| *H04W 8/00* | (2009.01) |

(52) U.S. Cl.
CPC .............. *H04W 8/186* (2013.01); *H04L 29/06* (2013.01); *H04W 8/005* (2013.01)

(58) Field of Classification Search
CPC ... H04W 76/002; H04W 4/08; H04W 76/023; H04W 8/186; H04L 67/104
USPC ................................ 709/203, 223–229, 250
See application file for complete search history.

(56) References Cited

U.S. PATENT DOCUMENTS

| 6,493,561 | B1 | 12/2002 | Hasegawa |
| 7,010,305 | B2 | 3/2006 | Immonen et al. |
| 7,065,645 | B2 | 6/2006 | Teicher |
| 7,151,764 | B1 | 12/2006 | Heinonen et al. |
| 7,187,691 | B2 | 3/2007 | Gavette |
| 7,277,932 | B2 | 10/2007 | Adachi et al. |

(Continued)

FOREIGN PATENT DOCUMENTS

| CN | 1893396 A | 1/2007 |
| CN | 101141259 A | 3/2008 |

(Continued)

OTHER PUBLICATIONS

Bajko, G., "Tutorial on Location and Emergency Services," IEEE, IEEE Meeting Hawaii 2008, Sep. 10, 2008, slides 1-45.

(Continued)

*Primary Examiner* — Zarni Maung
(74) *Attorney, Agent, or Firm* — Conley Rose, P.C.; J. Robert Brown, Jr.

(57) ABSTRACT

A device may communicate with a peer-to-peer (P2P) network prior to associating with that network. The communications prior to association may include information about whether the P2P network is persistent or non-persistent. The information may include a persistent group intent field that identifies whether a device would prefer to join a persistent P2P network and allows a P2P network to advertise whether it is persistent.

18 Claims, 12 Drawing Sheets

(56) References Cited

U.S. PATENT DOCUMENTS

| | | |
|---|---|---|
| 7,606,209 B2 | 10/2009 | Watanabe |
| 7,683,773 B1 | 3/2010 | Goodall et al. |
| 7,684,333 B1 | 3/2010 | Dasylva et al. |
| 8,170,481 B2 | 5/2012 | Rangarajan et al. |
| 8,274,908 B2 | 9/2012 | Hsin et al. |
| 8,374,122 B2 | 2/2013 | Meier et al. |
| 8,442,024 B2 | 5/2013 | Montemurro et al. |
| 8,458,279 B2 | 6/2013 | Montemurro et al. |
| 8,463,175 B2 | 6/2013 | Bajko |
| 8,514,807 B2 | 8/2013 | Kim et al. |
| 8,594,064 B2 | 11/2013 | Kaushik et al. |
| 8,681,769 B2 | 3/2014 | Rawlins et al. |
| 8,750,180 B2 | 6/2014 | McCann et al. |
| 8,775,533 B2 * | 7/2014 | Hassan et al. ............... 709/206 |
| 8,792,489 B2 | 7/2014 | Anantharam et al. |
| 8,897,788 B2 | 11/2014 | Ruuska |
| 8,929,346 B2 | 1/2015 | Montemurro et al. |
| 8,942,221 B2 | 1/2015 | McCann et al. |
| 9,137,621 B2 | 9/2015 | McCann et al. |
| 2002/0141369 A1 | 10/2002 | Perras |
| 2002/0159418 A1 | 10/2002 | Rudnick et al. |
| 2002/0169883 A1 | 11/2002 | Bright et al. |
| 2003/0103521 A1 | 6/2003 | Raphaeli et al. |
| 2003/0117984 A1 | 6/2003 | Gavette |
| 2003/0134636 A1 | 7/2003 | Sundar et al. |
| 2003/0217168 A1 | 11/2003 | Adachi et al. |
| 2004/0014422 A1 | 1/2004 | Kallio |
| 2004/0090958 A1 | 5/2004 | Park et al. |
| 2005/0060319 A1 | 3/2005 | Douglas |
| 2005/0097362 A1 | 5/2005 | Winget et al. |
| 2005/0111419 A1 | 5/2005 | Kwon et al. |
| 2005/0210523 A1 | 9/2005 | Parnell et al. |
| 2005/0286456 A1 | 12/2005 | McNew |
| 2006/0067526 A1 | 3/2006 | Faccin et al. |
| 2006/0109113 A1 | 5/2006 | Reyes et al. |
| 2006/0114928 A1 | 6/2006 | Utsunomiya et al. |
| 2006/0142034 A1 | 6/2006 | Wentink et al. |
| 2006/0221901 A1 | 10/2006 | Yaqub et al. |
| 2006/0245373 A1 | 11/2006 | Bajic |
| 2007/0025297 A1 | 2/2007 | Lee et al. |
| 2007/0041344 A1 | 2/2007 | Yaqub et al. |
| 2007/0064655 A1 | 3/2007 | Ruuska |
| 2007/0064660 A1 | 3/2007 | Qi et al. |
| 2007/0086359 A1 | 4/2007 | Yaqub |
| 2007/0110092 A1 | 5/2007 | Kangude et al. |
| 2007/0124592 A1 | 5/2007 | Oyama |
| 2007/0153732 A1 | 7/2007 | Yao |
| 2007/0230389 A1 | 10/2007 | Amann et al. |
| 2007/0230423 A1 | 10/2007 | Yoshida et al. |
| 2007/0243888 A1 | 10/2007 | Faccin |
| 2008/0031212 A1 | 2/2008 | Ogura |
| 2008/0049761 A1 | 2/2008 | Lin et al. |
| 2008/0096580 A1 | 4/2008 | Montemurro |
| 2008/0123607 A1 | 5/2008 | Jokela |
| 2008/0141031 A1 | 6/2008 | Oba et al. |
| 2008/0151796 A1 | 6/2008 | Jokela |
| 2008/0178277 A1 | 7/2008 | Oba et al. |
| 2008/0261574 A1 | 10/2008 | Rinta-Aho et al. |
| 2008/0270534 A1 | 10/2008 | Xia et al. |
| 2008/0298333 A1 | 12/2008 | Seok |
| 2009/0010399 A1 | 1/2009 | Kim et al. |
| 2009/0031138 A1 | 1/2009 | Nakhjiri |
| 2009/0046657 A1 | 2/2009 | Kim et al. |
| 2009/0047922 A1 | 2/2009 | Buckley et al. |
| 2009/0047974 A1 | 2/2009 | Quinn |
| 2009/0067326 A1 | 3/2009 | Perrot et al. |
| 2009/0156213 A1 | 6/2009 | Spinelli et al. |
| 2009/0177759 A1 | 7/2009 | Ogawa et al. |
| 2009/0247111 A1 | 10/2009 | Sennett et al. |
| 2009/0252165 A1 | 10/2009 | Zhang et al. |
| 2009/0296688 A1 | 12/2009 | Bakker et al. |
| 2009/0296689 A1 | 12/2009 | Bakker et al. |
| 2009/0298458 A1 | 12/2009 | Bakker et al. |
| 2009/0310692 A1 | 12/2009 | Kafle et al. |
| 2010/0146272 A1 | 6/2010 | Centonza et al. |
| 2010/0169953 A1 | 7/2010 | Hofer et al. |
| 2010/0216434 A1 | 8/2010 | Marcellino et al. |
| 2010/0255864 A1 | 10/2010 | Alfano et al. |
| 2010/0271978 A1 | 10/2010 | Gupta et al. |
| 2010/0275249 A1 | 10/2010 | McCann et al. |
| 2010/0279684 A1 | 11/2010 | Salkintzis |
| 2010/0293293 A1 | 11/2010 | Beser |
| 2010/0325714 A1 | 12/2010 | Iyer et al. |
| 2011/0028093 A1 | 2/2011 | Patel et al. |
| 2011/0040969 A1 | 2/2011 | Yao et al. |
| 2011/0047382 A1 | 2/2011 | Wang et al. |
| 2011/0055218 A1 | 3/2011 | Capuozzo et al. |
| 2011/0072101 A1 | 3/2011 | Forssell et al. |
| 2011/0103232 A1 | 5/2011 | Sood |
| 2011/0149806 A1 | 6/2011 | Verma et al. |
| 2011/0149938 A1 | 6/2011 | Bajko |
| 2011/0154018 A1 | 6/2011 | Edstrom et al. |
| 2011/0162060 A1 | 6/2011 | Vijayakumar et al. |
| 2011/0188391 A1 * | 8/2011 | Sella et al. ............... 370/252 |
| 2011/0225272 A1 | 9/2011 | Montemurro et al. |
| 2011/0274082 A1 | 11/2011 | Calhoun et al. |
| 2011/0280227 A1 | 11/2011 | McCann et al. |
| 2011/0286405 A1 | 11/2011 | Kim et al. |
| 2012/0008605 A2 | 1/2012 | Montemurro et al. |
| 2012/0017267 A1 | 1/2012 | McCann et al. |
| 2012/0054106 A1 | 3/2012 | Stephenson et al. |
| 2012/0057568 A1 | 3/2012 | Lim et al. |
| 2012/0076117 A1 | 3/2012 | Montemurro et al. |
| 2012/0076118 A1 | 3/2012 | Montemurro et al. |
| 2012/0106514 A1 | 5/2012 | Zheng et al. |
| 2012/0116886 A1 | 5/2012 | Manku |
| 2012/0165056 A1 | 6/2012 | Kim et al. |
| 2012/0182970 A1 | 7/2012 | Ding et al. |
| 2012/0239755 A1 * | 9/2012 | Filgueiras et al. ............ 709/206 |
| 2012/0243524 A1 | 9/2012 | Verma et al. |
| 2012/0281609 A1 | 11/2012 | Kasslin et al. |
| 2013/0012260 A1 | 1/2013 | Salkintzis et al. |
| 2013/0028245 A1 | 1/2013 | Oerton et al. |
| 2013/0034023 A1 * | 2/2013 | Jung ........................... 370/255 |
| 2013/0039275 A1 | 2/2013 | Patil et al. |
| 2013/0051303 A1 | 2/2013 | Huang et al. |
| 2013/0064175 A1 | 3/2013 | Pandey et al. |
| 2013/0066936 A1 | 3/2013 | Krishnan et al. |
| 2013/0070739 A1 | 3/2013 | McCann et al. |
| 2013/0166759 A1 | 6/2013 | Rajamani et al. |
| 2013/0170351 A1 | 7/2013 | Reznik et al. |
| 2013/0259034 A1 | 10/2013 | Klein et al. |
| 2013/0259038 A1 | 10/2013 | Anantharam et al. |
| 2013/0259040 A1 | 10/2013 | Anantharam et al. |
| 2013/0281056 A1 | 10/2013 | Abraham et al. |
| 2013/0282793 A1 | 10/2013 | Swings et al. |
| 2013/0301607 A1 | 11/2013 | McCann et al. |
| 2013/0339478 A1 | 12/2013 | Edge et al. |
| 2014/0016612 A1 | 1/2014 | McCann et al. |
| 2014/0050167 A1 | 2/2014 | Smedman et al. |
| 2014/0073356 A1 | 3/2014 | Siomina et al. |
| 2014/0078935 A1 | 3/2014 | Sun |
| 2014/0086134 A1 * | 3/2014 | Smadi et al. ................ 370/312 |
| 2014/0101441 A1 | 4/2014 | Edstrom et al. |
| 2014/0286242 A1 | 9/2014 | McCann et al. |

FOREIGN PATENT DOCUMENTS

| | | |
|---|---|---|
| CN | 101142788 A | 3/2008 |
| CN | 101150442 A | 3/2008 |
| CN | 101379801 A | 3/2009 |
| CN | 101395949 A | 3/2009 |
| CN | 101583151 A | 11/2009 |
| CN | 101682539 A | 3/2010 |
| EP | 1 919 154 A1 | 5/2008 |
| EP | 1 921 818 A2 | 5/2008 |
| EP | 2 076 090 A1 | 7/2009 |
| EP | 2 093 967 A2 | 8/2009 |
| EP | 2 445 242 A1 | 4/2012 |
| JP | 2002314546 A | 10/2002 |
| JP | 2004186753 A | 7/2004 |
| JP | 2008537657 A | 9/2008 |
| JP | 2008544588 A | 12/2008 |
| TW | 200947966 A1 | 11/2009 |

(56) References Cited

FOREIGN PATENT DOCUMENTS

| | | |
|---|---|---|
| WO | 0245456 A1 | 6/2002 |
| WO | 03092218 A1 | 11/2003 |
| WO | WO 2007/083824 A1 | 7/2007 |
| WO | WO 2007/103055 A2 | 9/2007 |
| WO | 2007116337 A2 | 10/2007 |
| WO | 2008049213 A1 | 5/2008 |
| WO | 2008049214 A1 | 5/2008 |
| WO | 2008107306 A1 | 9/2008 |
| WO | 2009063093 A2 | 5/2009 |
| WO | WO 2009/101861 A1 | 8/2009 |
| WO | WO 2011/056307 | 5/2011 |
| WO | 2011073516 A1 | 6/2011 |
| WO | 2011132174 A1 | 10/2011 |

OTHER PUBLICATIONS

EPO Communication regarding Deficiencies in Written Opinion of the International Searching Authority dated Aug. 1, 2012 for corresponding European Application No. 10798589.7, 2 pages.

EPO Communication regarding Deficiencies in Written Opinion of the International Searching Authority dated Dec. 21, 2012 for corresponding European Application No. 11726170.1, 2 pages.

EPO Communication regarding Deficiencies in Written Opinion of the International Searching Authority dated Dec. 21, 2012 for corresponding European Application No. 11726171.9, 2 pages.

EPO Communication regarding Deficiencies in Written Opinion of the International Searching Authority dated Dec. 21, 2012 for corresponding European Application No. 11726172.7, 2 pages.

EPO Communication regarding Deficiencies in Written Opinion of the International Searching Authority dated Dec. 21, 2012 for corresponding European Application No. 11733699.0, 2 pages.

EPO Communication regarding Deficiencies in Written Opinion of the International Searching Authority dated Oct. 23, 2012 for corresponding European Application No. 11715272.8, 2 pages.

EPO Communication regarding Deficiencies in Written Opinion of the International Searching Authority dated Oct. 23, 2012 for corresponding European Application No. 11715273.6, 2 pages.

Hiller, T. et al., "A Container Type for the Extensible Authentication Protocol (EAP)," Network Working Group, Internet-Draft, <draft-hiller-eap-tlv-01.txt>, Internet Engineering Task Force Standard Working Draft, The Internet Society, May 2003, 10 pages.

IEEE P802.11 Wireless LANs, "TGae Requirements and Use Cases," Jan. 21, 2010, IEEE 802.11-10/0093r5, 6 pages.

IEEE Standard for Information Technology—Telecommunications and information exchange between systems—Local and metropolitan area networks—Specific requirements, "Part 11: Wireless LAN Medium Access Control (MAC) and Physical Layer (PHY) Specifications, Amendment 1: Radio Resource Measurement of Wireless LANs," IEEE Std 802.11k-2008, IEEE computer Society, Jun. 12, 2008, pp. 5, 58-61, 75-77, 100-105, 127 (244 pages).

IEEE Standard for Information Technology—Telecommunications and information exchange between systems—Local and metropolitan area networks—Specific requirements, "Part 11; Wireless LAN Medium Access Control (MAC) and Physical Layer (PHY) Specifications, Amendment 9: Interworking with External Networks," IEEE Std 802.11u-2011, Feb. 25, 2011, pp. 8, 75-86 (208 pages).

IEEE Standard for Information Technology—Telecommunications and information exchange between systems—Local and metropolitan area networks—Specific requirements, "Part 11; Wireless LAN Medium Access Control (MAC) and Physical Layer (PHY) Specifications," IEEE Std 802.11-2012, Mar. 29, 2012, pp. 54, 91, 196-199, 580-584, 712-726, 742-743, 1145-1156 (2793 pages).

IEEE Standard for Information Technology, "Part 11: Wireless LAN Medium Access Control (MAC) and Physical Layer (PHY) specifications, Amendment 8: Medium Access Control (MAC) Quality of Service Enhancements," IEEE Std 802.11e-2005, Nov. 11, 2005, 211 pages.

International Preliminary Report on Patentability dated Nov. 20, 2012 for corresponding International Application No. PCT/IB2011/001006, 10 pages.

International Preliminary Report on Patentability dated Nov. 20, 2012 for corresponding International Application No. PCT/IB2011/001008, 10 pages.

International Preliminary Report on Patentability dated Nov. 20, 2012 for corresponding International Application No. PCT/IB2011/001018, 7 pages.

International Preliminary Report on Patentability dated Nov. 20, 2012 for corresponding International Application No. PCT/IB2011/001023, 6 pages.

International Preliminary Report on Patentability dated Sep. 27, 2012 for corresponding International Patent Application No. PCT/IB2011/051040, 9 pages.

International Preliminary Report on Patentability dated Sep. 27, 2012 for corresponding International Patent Application No. PCT/IB2011/051044, 9 pages.

International Search Report and Written Opinion dated Dec. 10, 2012 for corresponding International Application No. PCT/CA2012/050635, 10 pages.

International Search Report and Written Opinion dated Jan. 9, 2013 for PCT Application No. PCT/CA2012/050793, 9 pages.

International Search Report and Written Opinion dated Jul. 27, 2011 for corresponding International Application No. PCT/IB2011/001006, 14 pages.

International Search Report and Written Opinion dated Jul. 27, 2011 for corresponding International Application No. PCT/IB2011/001008, 14 pages.

International Search Report and Written Opinion dated Jun. 30, 2011 in corresponding application No. PCT/IB2011/051040, 14 pages.

International Search Report and Written Opinion dated Jun. 30, 2011 in corresponding application No. PCT/IB2011/051044, 14 pages.

International Search Report and Written Opinion dated May 9, 2011 for corresponding International Application No. PCT/IB2010/002932, 12 pages.

International Search Report and Written Opinion dated Nov. 28, 2011 for corresponding International Application No. PCT/IB2011/001018, 10 pages.

International Search Report and Written Opinion dated Oct. 5, 2011 for corresponding International Application No. PCT/IB2011/001023, 11 pages.

Li, W. et al., "A Reliable Active Scanning Scheme for the IEEE 802.11 MAC Layer Handoff," University of Cincinnati, Sep. 8, 2003, pp. 71-74.

McCann, S., IEEE P802.11, Wireless LANs, Emergency URN Information, IEEE 802.11-10/0026r1, Jan. 2010, 6 pages.

Rosen et al, "Framework for Emergency Calling Using Internet Multimedia; draft-ietf-ecrit-framework-10," IETF, Internet Society (ISOC) 4, Jul. 27, 2009, pp. 1-37.

Schulzrinne et al., "Extensions to the Emergency Services Architecture for dealing with Unauthenticated and Unauthorized Devices; draft-schulzrinne-ecrit-unauthenticated-access-06.txt," IETF, Internet Society (ISOC) 6, Oct. 26, 2009, pp. 1-23.

McCann, Stephen, et al.; U.S. Appl. No. 14/854,685, filed Sep. 15, 2015; Title: Wireless Network Service Transaction Protocol; 57 pages.

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 1: pp. 1-1369).

"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 2: pp. 1370-2778).

Lin, Chen-Han, et al.; "Mobile Intelligent Agent Technologies to Support Intelligent Handover Strategy"; Proceedings of the Workshop on Wireless, Ad Hoc and Sensor Network; vol. 1; 2005; 8 pages.

"Draft Standard for Local and Metropolitan Area Networks: Media Independent Handover Services"; IEEE P802.21/D8.0; Dec. 2007; 343 pages.

(56) References Cited

OTHER PUBLICATIONS

Barber, Phillip, et al.; "Gas Version Control in 11ai"; Document: IEEE 802.11-11/1498-01-00ai; Oct. 24, 2011; 16 pages.
Bumiller, George; "Notes on Interworking with External Networks"; Document: IEEE 802.11-09/1272r2; Jul. 22, 2010; 156 pages.
Office Action dated Jun. 29, 2012; U.S. Appl. No. 12/780,603, filed May 14, 2010; 37 pages.
Office Action dated Jan. 2, 2013; U.S. Appl. No. 12/780,603, filed May 14, 2010; 35 pages.
Final Office Action dated Jun. 5, 2013; U.S. Appl. No. 12/780,603, filed May 14, 2010; 30 pages.
Office Action dated Dec. 17, 2013; U.S. Appl. No. 12/780,603, filed May 14, 2010; 27 pages.
Final Office Action dated Jun. 3, 2014; U.S. Appl. No. 12/780,603, filed May 14, 2010; 28 pages.
Notice of Allowance dated Sep. 2, 2014; U.S. Appl. No. 12/780,603, filed May 14, 2010; 7 pages.
Office Action dated Jun. 8, 2012; U.S. Appl. No. 12/780,709, filed May 14, 2010; 6 pages.
Office Action dated Aug. 23, 2012; U.S. Appl. No. 12/780,709, filed May 14, 2010; 13 pages.
Notice of Allowance dated Jan. 18, 2013; U.S. Appl. No. 12/780,709, filed May 14, 2010; 11 pages.
Office Action dated Apr. 3, 2012; U.S. Appl. No. 12/780,722, filed May 14, 2010; 15 pages.
Notice of Allowance dated Oct. 19, 2012; U.S. Appl. No. 12/780,722, filed May 14, 2010; 6 pages.
Notice of Allowance dated Feb. 5, 2013; U.S. Appl. No. 12/780,722, filed May 14, 2010; 6 pages.
Office Action dated Jul. 19, 2012; U.S. Appl. No. 12/780,614, filed May 14, 2010; 14 pages.
Office Action dated Nov. 16, 2012; U.S. Appl. No. 12/780,614, filed May 14, 2010; 6 pages.
Office Action dated Mar. 25, 2013; U.S. Appl. No. 12/780,614, filed May 14, 2010; 10 pages.
Final Office Action dated Jul. 19, 2013; U.S. Appl. No. 12/780,614, filed May 14, 2010; 7 pages.
Notice of Allowance dated Oct. 31, 2013; U.S. Appl. No. 12/780,614, filed May 14, 2010; 7 pages.
Office Action dated Nov. 16, 2012; U.S. Appl. No. 13/045,622, filed Mar. 11, 2011; 19 pages.
Final Office Action dated Jul. 12, 2013; U.S. Appl. No. 13/045,622, filed Mar. 11, 2011; 17 pages.
Office Action dated Oct. 11, 2012; U.S. Appl. No. 13/045,658, filed Mar. 11, 2011; 11 pages.
Final Office Action dated May 15, 2013; U.S. Appl. No. 13/045,658, filed Mar. 11, 2011; 11 pages.
Office Action dated Jul. 12, 2013; U.S. Appl. No. 13/234,799, filed Sep. 16, 2011; 16 pages.
Notice of Allowance dated Jan. 30, 2014; U.S. Appl. No. 13/234,799, filed Sep. 16, 2011; 7 pages.
Office Action dated Apr. 20, 2015; U.S. Appl. No. 14/298,289, filed Jun. 6, 2014; 10 pages.
Final Office Action dated Aug. 5, 2015; U.S. Appl. No. 14/298,289, filed Jun. 6, 2014; 34 pages.
Advisory Action dated Oct. 15, 2015; U.S. Appl. No. 14/298,289, filed Jun. 6, 2014; 3 pages.
Office Action dated Jul. 11, 2013; U.S. Appl. No. 13/407,444, filed Feb. 28, 2012; 14 pages.
Office Action dated Dec. 31, 2013; U.S. Appl. No. 13/407,444, filed Feb. 28, 2012; 11 pages.
Final Office Action dated Jun. 3, 2014; U.S. Appl. No. 13/407,444, filed Feb. 28, 2012; 11 pages.
Notice of Allowance dated Sep. 17, 2014; U.S. Appl. No. 13/407,444, filed Feb. 28, 2012; 5 pages.
Office Action dated Feb. 4, 2014; U.S. Appl. No. 13/548,864, filed Jul. 13, 2012; 15 pages.
Final Office Action dated Jul. 11, 2014; U.S. Appl. No. 13/548,864, filed Jul. 13, 2012; 10 pages.
Office Action dated Oct. 30, 2014; U.S. Appl. No. 13/548,864, filed Jul. 13, 2012; 10 pages.
"Wi-Fi Peer-to-Peer (P2P) Technical Specification"; Draft Version 1.14; Wi-Fi Alliance Technical Committee P2P Task Group; Jun. 25, 2010; 22 pages.
PCT International Search Report; Application No. PCT/CA2014/050060; Apr. 15, 2014; 3 pages.
PCT International Search Report; Application No. PCT/CA2014/050060; Apr. 15, 2014; 7 pages.
Notice of Allowance dated May 1, 2015; U.S. Appl. No. 13/548,864, filed Jul. 13, 2012; 14 pages.
Office Action dated Jan. 14, 2014; U.S. Appl. No. 13/469,618, filed May 11, 2012; 28 pages.
Final Office Action dated Jul. 9, 2014; U.S. Appl. No. 13/469,618, filed May 11, 2012; 31 pages.
Office Action dated Jan. 21, 2015; U.S. Appl. No. 13/469,618, filed May 11, 2012; 26 pages.
Notice of Allowance Jul. 23, 2015; U.S. Appl. No. 13/469,618, filed May 11, 2012; 15 pages.
Office Action dated Dec. 31, 2014; U.S. Appl. No. 13/547,880, filed Jul. 12, 2012; 19 pages.
Final Office Action dated Aug. 27, 2015; U.S. Appl. No. 13/547,880, filed Jul. 12, 2012; 26 pages.
Taiwan Office Action; Application No. 100108467; Aug. 9, 2013; 12 pages.
Canadian Office Action; Application No. 2,793,375; Oct. 18, 2013; 3 pages.
Canadian Office Action; Application No. 2,793,375; Jun. 25, 2014; 3 pages.
Canadian Office Action; Application No. 2,793,375; Jul. 10, 2015; 5 pages.
Chinese Office Action; Application No. 201180023969.5; Oct. 30, 2014; 20 pages.
Chinese Office Action; Application No. 201180023969.5; Jul. 20, 2015; 10 pages.
Japanese Office Action; Application No. 2012-557644; Oct. 17, 2013; 5 pages.
Japanese Office Action as Received in Co-pending Application No. 2014-019062 on Nov. 21, 2014; 2 pages. (No English translation available).
Canadian Office Action; Application No. 2,799,291; May 28, 2014; 3 pages.
Canadian Office Action; Application No. 2,799,291; Jun. 2, 2015; 4 pages.
Chinese Office Action; Application No. 201180033223.2; Jan. 22, 2015; 15 pages.
Chinese Office Action as Received in Co-pending Application No. 201180033223.2 on Oct. 10, 2015; 5 pages. (No English translation available).
Canadian Office Action; Application No. 2,799,292; May 27, 2014; 3 pages.
Canadian Office Action; Application No. 2,799,292; Jun. 8, 2015; 4 pages.
Chinese Office Action as Received in Co-pending Application No. 201180033260.3 on Jun. 3, 2015; 10 pages. (No English translation available).
Canadian Office Action; Application No. 2,799,295; Oct. 31, 2014; 4 pages.
Chinese Office Action as Received in Co-pending Application No. 201180033296.1 on Dec. 31, 2014; 7 pages. (No English translation available).
European Examination Report; Application No. 11726172.7; Feb. 10, 2015; 4 pages.
Canadian Office Action; Application No. 2,799,293; Jun. 16, 2014; 2 pages.
Canadian Office Action; Application No. 2,799,293; Jul. 13, 2015; 6 pages.
Chinese Office Action; Application No. 201180033197.3; Dec. 12, 2014; 20 pages.
Chinese Office Action; Application No. 201180033197.3; Aug. 18, 2015; 16 pages.
Canadian Office Action; Application No. 2,848,754; Sep. 24, 2015; 4 pages.

(56) References Cited

OTHER PUBLICATIONS

European Extended Search Report; Application No. 12831400.2; Jul. 3, 2015; 10 pages.
Korean Office Action as Received in Co-pending Application No. 10-2014-7008921 on Mar. 23, 2015; 3 pages. (No English translation available).
Korean Notice of Allowance; Application No. 10-2014-7008921; Sep. 18, 2015; 3 pages.
European Extended Search Report; Application No. 12847065.5; Jul. 13, 2015; 11 pages.
Korean Office Action as Received in Co-pending Application No. 10-2014-7015745 on Apr. 29, 2015; 6 pages. (No English translation available).
Taiwan Search Report; Application No. 102124777; Dec. 9, 2014; 1 pages.
PCT International Search Report; Application No. PCT/CA2013/050540; Sep. 17, 2013; 3 pages.
PCT Written Opinion of the International Searching Authority; Application No. PCT/CA2013/050540; Sep. 17, 2013; 3 pages.
Taiwan Office Action; Application No. 102116774; Oct. 27, 2014; 16 pages.
Taiwan Office Action; Application No. 102116774; Jun. 12, 2015; 16 pages.
PCT International Search Report; Application No. PCT/CA2013/050362; Aug. 2, 2013; 4 pages.
PCT Written Opinion of the International Searching Authority; Application No. PCT/CA2013/050362; Aug. 2, 2013; 5 pages.
Taiwan Search Report; Application No. 102122238; Dec. 24, 2014; 1 page.
Taiwan Search Report; Application No. 102122238; Sep. 21, 2015; 7 pages.
PCT International Search Report; PCT/CA2013/050539; Sep. 16, 2013; 3 pages.
PCT Written Opinion of the International Searching Authority; PCT/CA2013/050539; Sep. 16, 2013; 4 pages.
McCann, Stephen, et al.; U.S. Appl. No. 14/952,574, filed Nov. 25, 2015; Title: Extended Service Set Transitions in Wireiess Networks; 49 pages.
Cao, Z., et al.; "DHCPv4 and DHCPv6 Options for Access Network Query Protocol Servers"; draft-cao-dhc-anqp-option-00; Jul. 9, 2012; 8 pages.
Office Action dated Nov. 16, 2015; U.S. Appl. No. 14/298,289, filed Jun. 6, 2014; 13 pages.
Advisory Action dated Dec. 2, 2015; U.S. Appl. No, 13/547,880, filed Jul. 12, 2012; 3 pages.
Advisory Action dated Jan. 20, 2016; U.S. Appl. No. 13/547,880, filed Jul. 12, 2012; 4 pages.
European Examination Report; Application No. 11715273.6; Jan. 13, 2016; 6 pages.
Chinese Office Action as Received in Co-pending Application No. 201180033260.3 on Jan. 20, 2016; 3 pages.(No English translation available).
Chinese Office Action as Received in Co-pending Application No. 201180033296.1 on Dec. 16, 2015; 3 pages. (No English translation available).
European Examination Report; Application No. 11733699.0; Jan. 15, 2016; 6 pages.
European Extended Search Report; Application No. 13816111.2; Feb. 3, 2016; 7 pages.
European Extended Search Report; Application No. 13788377.3; Dec. 21, 2015; 8 pages.
European Extended Search Report; Application No. 13817511.2; Feb. 12, 2016; 9 pages.

* cited by examiner

COMMUNICATION LAYER ARCHITECTURE

PERSISTENT NETWORK NEGOTIATION FOR PEER TO PEER DEVICES

PRIORITY

This application claims priority as a non-provisional application to Provisional Application No. 61/761,576, filed on Feb. 6, 2013, entitled "Persistent Network Negotiation for Peer to Peer Devices," the entire disclosure of which is hereby incorporated by reference.

BACKGROUND

Wireless network deployments, such as wireless local area networks ("WLANs"), allow mobile devices to access network and Internet services when within proximity of wireless communication signals of those wireless networks. Peer-to-peer ("P2P") networks allow connectivity between individual devices. In one example, a P2P network may be referred to as a group and include a group owner (GO) that is the master device for the group that may manage signaling, timing, clock synchronization, etc., and establish certain group settings (e.g., the group may be set as a persistent group or a non-persistent group). A non-persistent group only lasts (i.e., remains intact as a group) as long as a device is in communication range of the group and other devices within the group. A non-persistent group treats a device that wants to re-join as if the device is a new device joining the group for the first time. In contrast, a persistent group is a group in which the group owner and/or other devices within the group are able to store persistent information related to the group. In other words, the term "persistence" when used in reference to a persistent or a non-persistent group implies the ability (or lack of ability) of a group owner and/or group member to store information associated with that group as well as information associated with the devices that join the group. Therefore, information for joining the group may persist (i.e., remain stored) within a device for a persistent group. In one embodiment, the P2P network may utilize either wireless fidelity (Wi-Fi) or Wireless LAN (WLAN) between wireless devices. For example, the Wi-Fi Alliance (WFA) established guidelines for peer to peer connectivity between Wi-Fi enabled devices that is referred to as "Wi-Fi Direct" and outlined in the Wi-Fi Peer-to-Peer (P2P) Technical Specification from 2010.

DETAILED DESCRIPTION

The disclosed systems and methods allow mobile devices or wireless devices to communicate with a peer-to-peer (P2P) network or group prior to negotiating which device will become group owner ("group owner negotiation") of that P2P network. The communications prior to group owner negotiation may include information about whether the P2P network or group is persistent or non-persistent. The information may include a persistent group intent field that identifies whether a device would prefer to join a persistent P2P network or group and allows a P2P network or group to advertise whether the P2P network or group is persistent.

The communication between a wireless device and a P2P network/group may be through Wi-Fi or WLAN protocols. The wireless device and a group (or a group owner) may communicate prior to the wireless device joining the group. These communications that occur prior to the device joining the group are preceded by a discovery phase, which may include discovery communications or discovery information, and is followed by association communications in which a device associates with the group after joining the group. Group owner negotiation may be part of the joining process. A persistent group intent (PGI) field may be communicated prior to a device joining a particular group.

Figure 4:
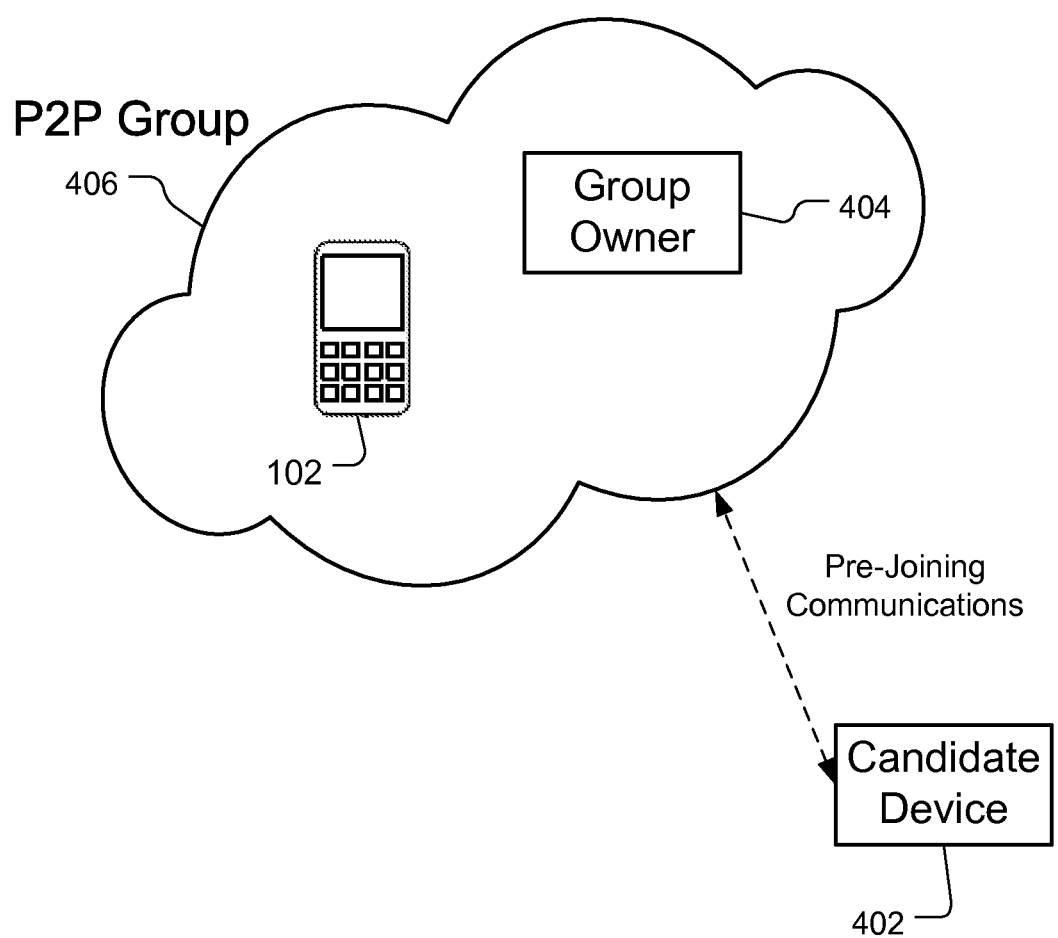
FIG. 4 illustrates an alternative communication network.

Wireless or mobile devices that communicate prior to joining a group may include mobile communication devices, mobile computing devices, fixed computing devices, or any other device capable of communicating wirelessly with a wireless network. Such devices may also be referred to as terminals, mobile devices, stations ("STA") or user equipment, and may also include mobile smart phones (e.g., a BlackBerry® smart phone, BlackBerry® Playbook or BlackBerry® Mobile Computer), wireless personal digital assistants ("PDA"), machine to machine equipment, equipment within a smart grid ("SmartGrid"), printers, displays, equipment within a mesh network (an ad-hoc or peer network), laptop/tablet/notebook/netbook computers with wireless adapters, etc. FIG. 4 illustrates one embodiment of a mobile device or terminal.

As described, a P2P network or group may include one or more wireless devices. The connection for the network or group may be through a wireless network such as with WLAN protocols. In one embodiment, a group may be established for certain devices connected to a WLAN. In alternative devices, the devices may discover information about other networks/groups through other protocols and architectures, including a cellular network or a WiMax network. The group may be part of a network which may further comprise a publicly accessible network, such as the Internet, a private network, such as an intranet, or combinations thereof, and may utilize a variety of networking protocols now available or later developed including, but not limited to TCP/IP based networking protocols. The networks may include any communication method or employ any form of machine-readable media for communicating information from one device to another.

Figure 1:
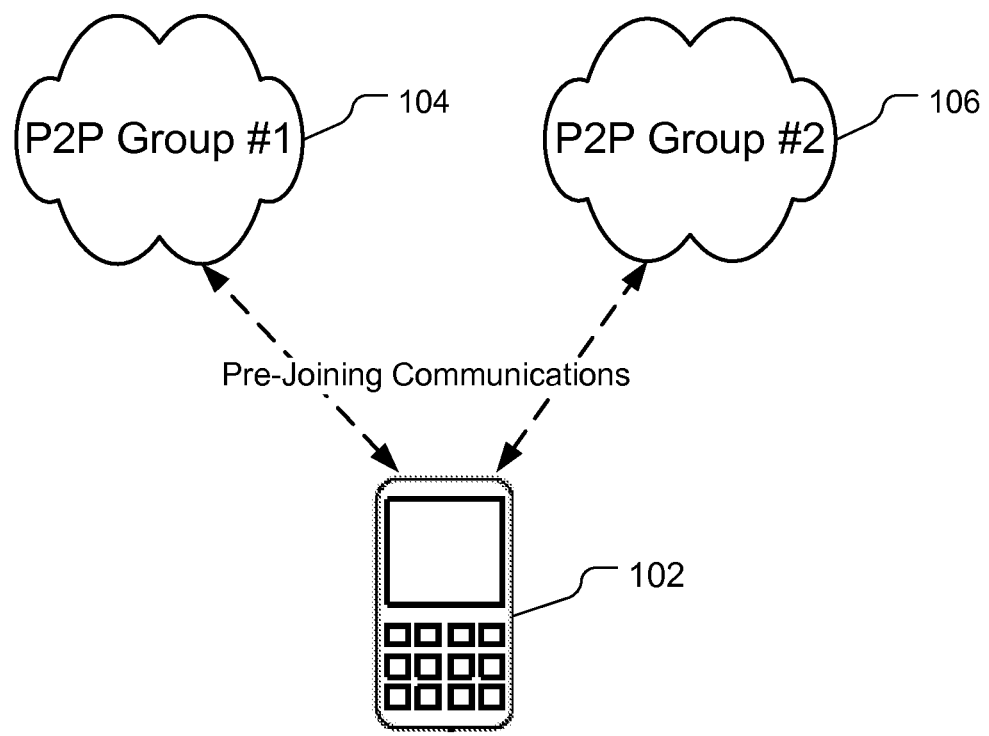
FIG. 1 illustrates a communication network.

FIG. 1 illustrates a communication network. A wireless device 102 may communicate with one or more P2P groups. A P2P network may also be referred to as a P2P group or just a group throughout this disclosure for simplicity. A group may refer to a P2P group comprising a group owner (GO) and one or more devices associated with the GO. The wireless device 102 may also be referred to as a P2P device and is further described below with respect to FIG. 4. FIG. 1 illustrates a first P2P group 104 and a second P2P group 106 that communicate with the wireless device 102. In alternative embodiments, there may be more or fewer groups for a wireless device to connect with.

The communications may be pre-joining, which means that the wireless device 102 has not joined one of the groups 104, 106, but still communicates with the groups prior to joining. Likewise, the communications may be pre-association, which means that the wireless device 102 is not associated with one of the groups 104, 106, but still communicates with the groups prior to association. The communications may be at any stage of the group pre-association process, including where the wireless device 102 has not yet joined a group and/or where negotiation with the GO are not complete, and may further include a find phase, scan phase, and/or the time period when the wireless device 102 is in a listen state.

Through pre joining communications, the wireless device 102 may retrieve information about the available groups 104, 106. Likewise, the wireless device 102 may transmit information about potential features required for the wireless device 102 to connect with (or join) a particular group. The communications illustrated and described below are transmitted before the wireless device 102 joins a particular group. Those communications (i.e., the pre-joining communications) may also be referred to as discovery communications. In one embodiment, the pre joining communications may include information about a persistent state of the groups 104, 106. Likewise, the wireless device 102 may communicate its preferences regarding joining a persistent or non-persistent network.

Persistency refers to whether a group is set as a persistent group or a non-persistent group. A persistent group is a P2P peer group with a group owner (GO) and other devices are able to store persistent information specifically related to that group. In a persistent group, the GO and other devices of that group store persistent information (e.g. credentials, group owner identity, etc.) in order to form a persistent P2P group (PPG). The credentials may include encryption keys, identifiers, or other information. The PPG may terminate because a device is disconnected from the group, as a result of a positive action within the group, or if the GO and the device lose mutual connectivity (e.g. a reduction in signal strength or quality results due to a radio fade or interference). If one of the devices previously connected to the PPG re-discovers the same PPG, it may use its stored persistence information (e.g. credentials) to re-connect to the PPG. Since the credentials were stored, the device may omit some or all of the negotiation and/or authentication steps in the process of re-joining the PPG. Conversely, an attempt by a device that was previously connected to a non-persistent group to re-connect with that non-persistent group includes the entire negotiation/authentication process as if the device was never previously connected with the group. In other words, the term "persistent" with regards to whether a group is persistent or non-persistent equates to the ability (or inability) of a group owner and/or group member to store information associated with that group as well as information associated with the devices that join the group.

Accordingly, FIG. 1 illustrates that pre joining information may be transmitted between a device and a group (or GO) while the device is deciding whether to join the group. Previously, persistency information was only transmitted to/from a candidate device once that candidate was connected with a group. In one embodiment, the communication of information (e.g., a persistent group intent (PGI) value) regarding persistency may be transmitted as part of a Persistent Group Intent (PGI) field. The PGI value may indicate whether a device intends (i.e., possesses an intent) to store persistent P2P group (PPG) information and/or a desire that the group (when established) uses persistence. The PGI value may be part of a connection capability field: as shown in Table 1 below:

TABLE 1

Connection Capability Field

| Bit | Information | Notes |
|---|---|---|
| 0 | New | Set to 1 indicates that the device can be either Client or GO. Otherwise, set to 0. |
| 1 | Client | Set to 1 indicates that the device is a Client or may be Client only. Otherwise, set to 0. |
| 2 | GO | Set to 1 indicates that the device is a GO or may be GO only. Otherwise, set to 0. |
| 3 | Persistent Group Intent (PGI) | When transmitted by a device which has not yet joined a group and/or where GO negotiation is not complete. The device may be in the find phase, scan phase or in the listen state. Set to 1 indicates that the device: 1) intends to store persistent group information if it becomes GO of the group; and 2) that it wishes the group to be persistent. When transmitted by a device in an established group, set to 1 indicates that persistence is enabled within the group. Otherwise, set to 0 by a device in an established group to indicate that persistence is not enabled within the group. |
| 4-7 | Reserved | — |

The PGI bit field which includes a PGI bit set to the PGI value may be transmitted prior to P2P group association or prior to a device joining the group. A device sets the PGI value of a PGI bit within the PGI field to 1, in the Connection Capabilities Attribute to indicate that the device intends to store persistent information (e.g. credentials) when a P2P group is established. If a device sets the PGI value to 0, the device is not intending (i.e., lacks the intent or does not possess the intent) to store persistent information. Alternative bits and/or fields may be used to convey the intent or lack of intent of a device to store persistent information including a PGI value which may be transmitted in an attribute other than the connection capability field as illustrated in the example of Table 1. In particular, the signaling described in these embodiments may be incorporated in any existing or new frame, which may be transmitted or received by a device prior to joining a group.

Figure 2:
FIG. 2 illustrates candidate devices in communication.

FIG. 2 illustrates candidate devices in communication. A first candidate device 202 communicates with a second candidate device 204. The candidate devices 202, 204 may be examples of the wireless device 102 that are not connected to the network and may be further described with respect to FIG. 6. The communications between the candidate devices 202, 204 are prior to either device joining a group. In one embodiment, the communications may include persistence information (e.g. PGI bit) that either candidate device 202, 204 may use in deciding to establish a group and deciding whether the group will be persistent or not.

Figure 3:
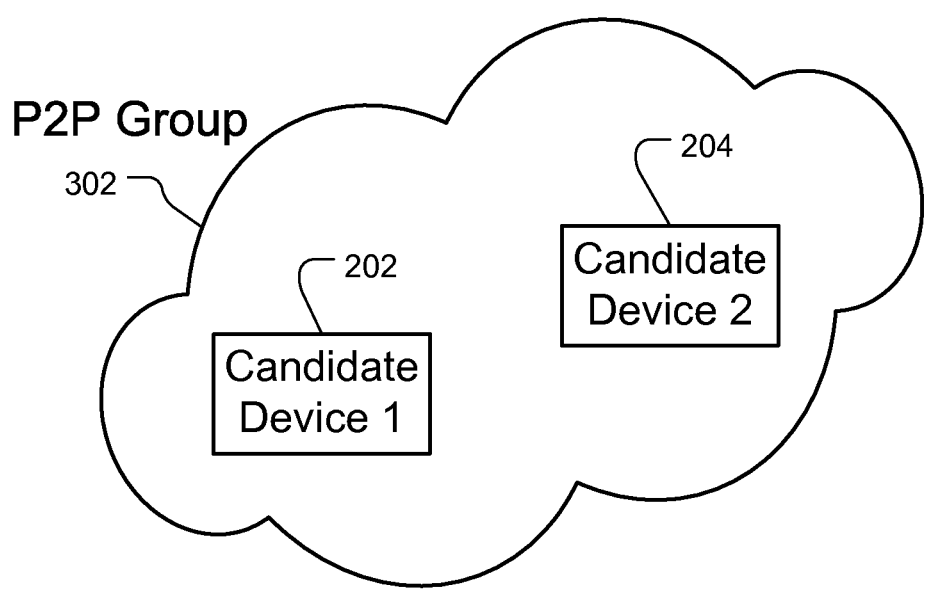
FIG. 3 illustrates candidate devices forming a group.

FIG. 3 illustrates candidate devices forming a group. In particular, the candidate devices 202, 204 of FIG. 2 (after their pre joining communications) can form the P2P group 302 as shown in FIG. 3. The pre joining communications may include persistence information that is used for determining whether the group 302 should be persistent or not. In addition, persistence information may be used for determining which device should be the group owner (GO). In one embodiment, when one of the candidate devices 202, 204 desires a persistent group, that device is the GO for a persistent group. The other device (not desiring a persistent group) can still join the persistent group, but may choose not to save information regarding the group. A GO intent level (discussed with respect to FIG. 7) may also be used in identifying the GO.

FIG. 4 illustrates an alternative communication network. In particular, a P2P group 406 (which may be either of the P2P Groups 104, 106 from FIG. 1 or group 302 from FIG. 3) may include the wireless device 102 from FIG. 1, in addition to a group owner (GO) 404. A candidate device 402 may engage in pre joining communications with the group 406. The candidate device 402 may be either of the candidate devices 202, 204 and may also be the wireless device 102 as described with respect to FIG. 6. As discussed above, the communications may include persistence information indicating whether the group 406 is persistent or non-persistent, such as with the PGI bit. In one embodiment, the GO 404 and candidate device 402 are wireless devices as with the wireless device 102 and as further described below with respect to FIG. 6.

The candidate device 402 may be a device which is capable of receiving advertisements (e.g., an advertisement including a PGI bit associated with the group 406) from another peer device (including a GO, such as GO 404) during pre joining or discovery communications. The candidate device 402 may not be connected to a group during these communications and negotiations. In one example, the candidate device 402 may desire to join a persistent network, but during pre joining or discovery communications with the group 406, the candidate device 402 may determine, based on a value of a PGI bit received from the GO 404, that persistence is not enabled within the group 406, and the candidate device 402 may then decide to decline to join the group 406. The candidate device 402 may then attempt to find and join an alternative network which the candidate device 402 determines to be persistent. In other implementations, the candidate device 402 desiring to join a persistent network may decide to join the group 406 even after determining that persistence is not enabled within the group 406. In one embodiment, the group 406 (or the GO 404 on behalf of the group 406) advertises (e.g., broadcasts, unicasts, or multicasts) the persistence information (e.g., a PGI bit having a PGI value) to device(s) within communication range of the group 406.

Figure 5:
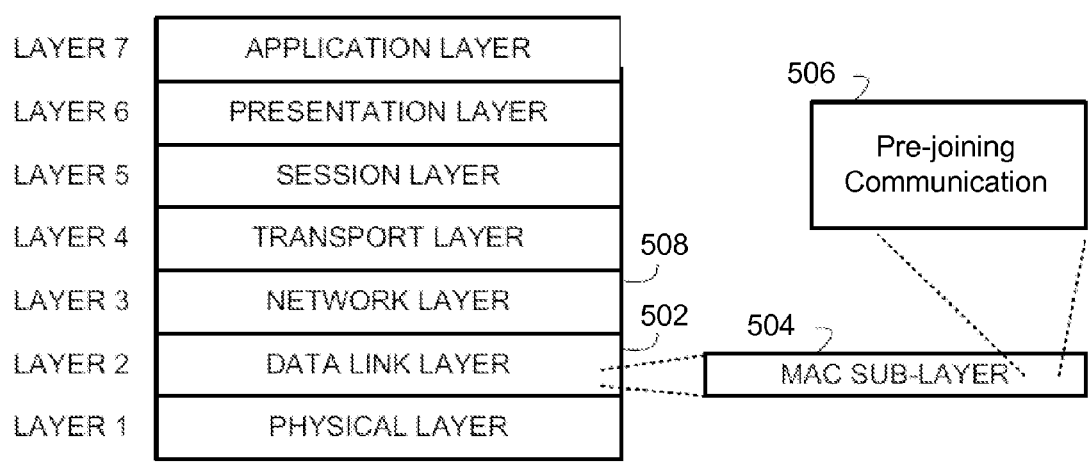
FIG. 5 illustrates a communication layer architecture.

FIG. 5 illustrates a communication layer architecture 500. The communication layer architecture 500 includes seven layers which may be implemented in accordance with the Open Systems Interconnection ("OSI") Reference Model. The communication layer architecture 500 includes a data link layer 502, which includes a media access control ("MAC") sub-layer 504. The MAC sub-layer provides addressing and channel access control mechanisms that make it possible for several devices or network nodes to communicate within a multiple access network that incorporates a shared medium, e.g. Ethernet. The hardware that implements the MAC may be referred to as a medium access controller. The MAC sub-layer acts as an interface between the logical link control ("LLC") sub layer and the network's physical layer. The MAC layer emulates a full-duplex logical communication channel in a multi-point network. This channel may provide unicast, multicast or broadcast communication service Wireless devices (e.g., the wireless device 102 of FIG. 1 or the candidate devices of FIGS. 2-4) may communicate prior to joining a group (i.e. pre joining communications 506). The inclusion of pre joining communications 506 on the MAC sub-layer 504 may allow for a mobile device to communicate with a group or other devices before joining a group. In particular, the persistence information that is advertised during pre joining communications 506 may be exchanged at the MAC sub-layer 504. A wireless device may access information from a memory or other hardware of the mobile device at the MAC sub-layer 504 without needing to perform operations at or above an internet protocol layer (e.g., a network layer 508) and without needing to provide access to the internet protocol layer. Low-level resource operations at the MAC sub-layer require relatively fewer system resources than user-interface-intensive and operating system intensive operations (e.g., web-browser operations) at an application layer.

Figure 6:
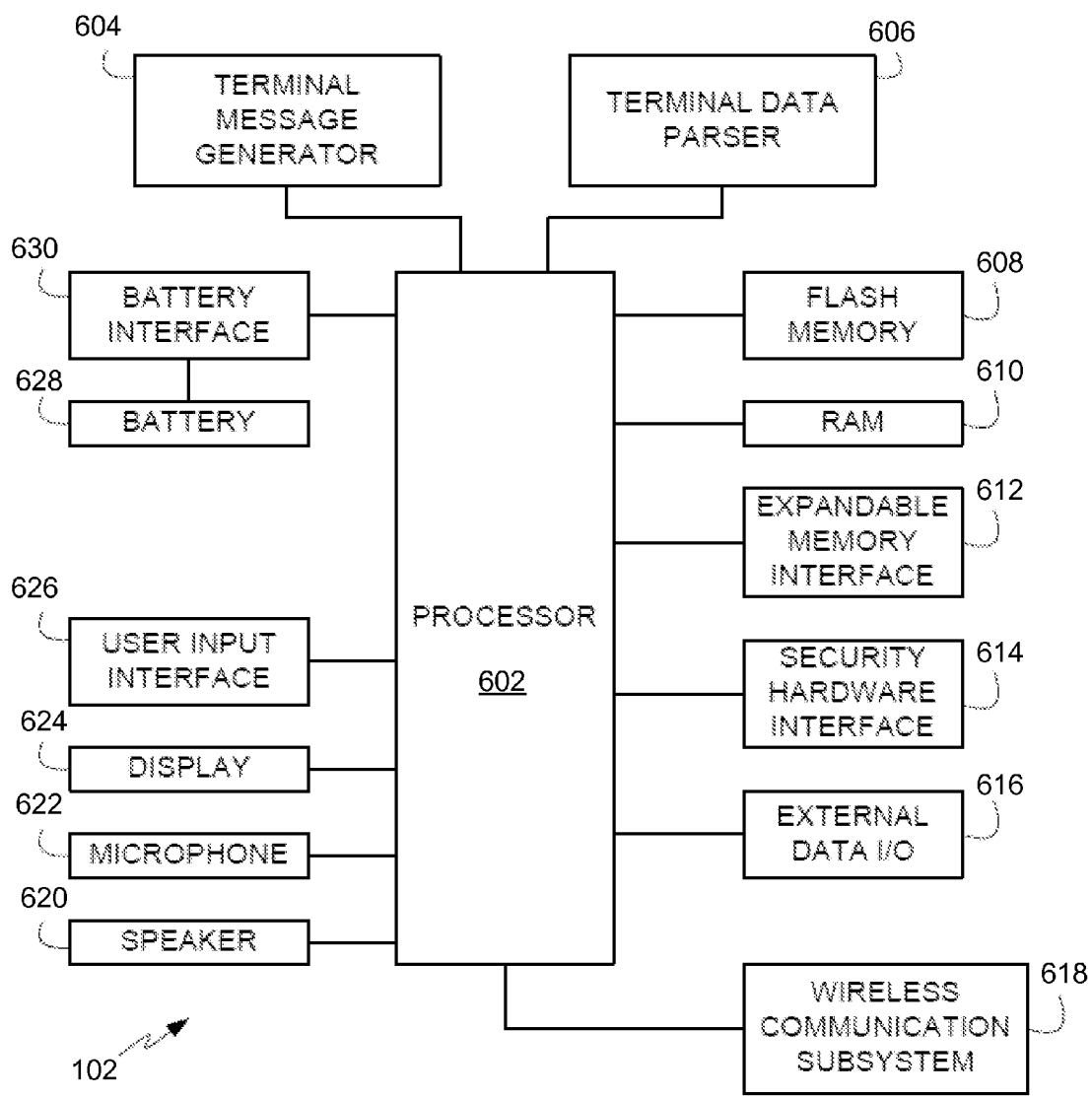
FIG. 6 illustrates a wireless device ("STA")

FIG. 6 illustrates a wireless device ("STA") 102 as shown in FIGS. 1 and 4. The wireless device 102 shown in FIG. 6 may also be any of the candidate devices shown in FIGS. 2-4, but is referred to throughout as wireless device 102 for simplicity. The wireless device 102 includes a processor 602 that may be used to control the overall operation of the wireless device 102. The processor 602 may be implemented using a controller, a general purpose processor, a digital signal processor, dedicated hardware, or any combination thereof. The processor 602 may include a central processing unit, a graphics processing unit, a digital signal processor or other type of processing device. The processor 602 may be a component in any one of a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may operate in conjunction with a software program, such as code generated manually (i.e., programmed).

The wireless device 102 also includes a terminal message generator 604 and a terminal data parser 606. The terminal message generator 604 may generate discovery messages such as the pre joining communications shown in FIGS. 1-4. The terminal data parser 606 may be used to retrieve network information from memory (e.g., random access memory 610, etc.). For example, the terminal data parser 606 may request discovery information (e.g. persistent state information for one or more groups) from a network/group.

In the illustrated embodiment, the terminal message generator 604 and the terminal data parser 606 are shown as separate from and connected to the processor 602. In alternative embodiments, the terminal message generator 604 and the terminal data parser 606 may be implemented in the processor 602 and/or in a wireless communication subsystem (e.g., a wireless communication subsystem 618). The terminal message generator 604 and the terminal data parser 606 may be implemented using any combination of hardware, firmware, and/or software. For example, one or more integrated circuits, discrete semiconductor components, and/or passive electronic components may be used. For example, the terminal message generator 604 and the terminal data parser 606, or parts thereof, may be implemented using one or more circuits, programmable processors, application specific integrated circuits, programmable logic devices, field programmable logic devices, etc.

The terminal message generator 604 and the terminal data parser 606, or parts thereof, may be implemented using instructions, code, and/or other software and/or firmware, etc. stored on a machine accessible medium and executable by, for example, a processor (e.g., the processor 602). The terminal message generator 604 or the terminal data parser 606 may be stored on or include a tangible storage medium or memory.

For example, the terminal message generator 604 or the terminal data parser 606 may be implemented in software stored on a memory that is executable by the processor 602. Alternatively, the terminal message generator 604 and/or the terminal data parser 606 may be implemented in hardware with software functions. The memory for storing software associated with the terminal message generator 604 and/or the terminal data parser 606 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 610 for the processor 602, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store user data. The memory is operable to store instructions executable by the processor 602.

The wireless device 102 may include a FLASH memory 608, a random access memory 610, and/or an expandable memory interface 612 coupled with the processor 602. The FLASH memory 608 may store computer readable instructions and/or data. In some embodiments, the FLASH memory 608 and/or the RAM 610 may store the discovery communications 120 (service information) from FIG. 1 and instructions for communicating that information. The processor 602 may be coupled with the memory (e.g. the FLASH memory 608, or the RAM 610) for storing software instructions executable by the processor 602. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 602 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The wireless device 102 may include a security hardware interface 614 to receive a SIM card from a wireless service provider. A SIM card may be used for service discovery communications including authentication of the wireless device 102 for establishing a connection with a WLAN-supported network. The wireless device 102 may be provided with an external data I/O interface 616. The external data I/O interface 616 may be used by a user to transfer information to the wireless device 102 through a wired medium.

The wireless device 102 may include wireless communication subsystem 618 to enable wireless communications with other devices or with a P2P group/network. Although not shown, the wireless device 102 may also have a long-range communication subsystem to receive messages from, and send messages to, a cellular wireless network. In the illustrated examples described herein, the wireless communication subsystem 618 can be configured in accordance with the IEEE® 802.11 standard. In other example implementations, the wireless communication subsystem 618 may be implemented using a BLUETOOTH® radio, a ZIGBEE® device, a wireless USB device, an ultra-wideband radio, a Near Field Communications ("NFC") device, or a Radio Frequency Identifier ("RFID") device.

The wireless device 102 may include a user interface for communicating to/from the device. The user interface may be separate component or it may include a speaker 620, a microphone 622, a display 624, and a user input interface 626. The display 624 may be a liquid crystal display, an organic light emitting diode, a flat panel display, a solid state display, a cathode ray tube, a projector, a printer or other now known or later developed display device for outputting determined information. The user input interface 626 may include alphanumeric keyboard and/or telephone-type keypad, a multi-direction actuator or roller wheel with dynamic button pressing capability, a touch panel, etc. The P2P discovery information that is communicated with a network prior to connection may be communicated with or without each of the user interfaces described herein. The speaker, 620, the microphone 622, the display 624, the user input interface 626, and/or any combination thereof may be omitted in alternative embodiments. In one embodiment, the wireless device 102 is a battery-powered device and includes a battery 628 and a battery interface 630.

Figure 7:
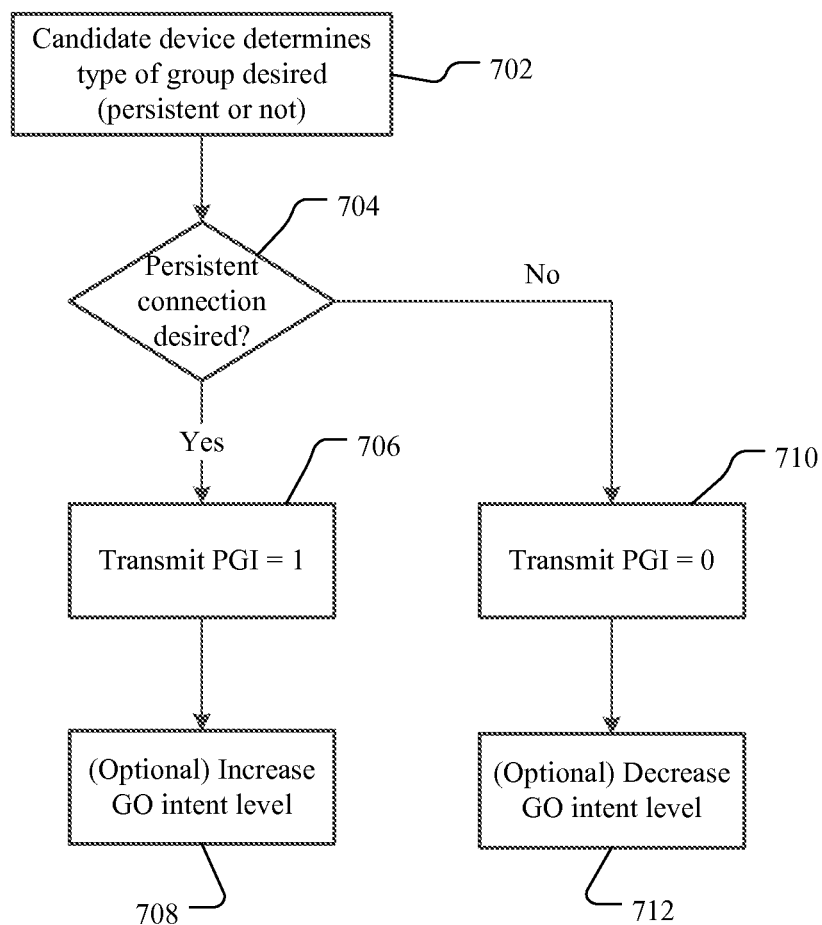
FIG. 7 illustrates a process for a wireless device discovering a P2P group.

FIG. 7 illustrates a process for a wireless device discovering a P2P group. A candidate device (e.g. the candidate devices in FIGS. 2-4) determines which type of group the candidate device would like (prefer) to join as in block 702. The determination regarding which type of group the candidate device desires (intends) to join may include determining whether the candidate device desires to join a persistent group or a non-persistent group. This determination in block 702 may be made in response to one or more of the following five indications.

First, an application specific indication (e.g. exposed at an Application Programming Interface (API)) or the identity, nature, and/or type of an application may be considered in the determination as to whether the group which the candidate device joins should or should not be persistent. As such, the determination of whether the candidate device desires to join a persistent group or a non-persistent group is made based on the application(s) (or signaling from the application(s)). In some implementations, the application(s) (or signaling from the application(s) may in fact trigger the P2P group discovery process.

Second, there may be a user-provided input (e.g. the user is given a choice prior to joining the group or the user/administrator may be able to configure settings within the device, etc.) regarding the desire for group persistence. The input may be provided via a User Interface (UI) on the device, and may be pre-configured or be configured remotely.

Third, there may be a service-specific indication (e.g. for Wi-Fi Direct Services (WFDS) or IEEE 802.11aq—Pre Association Discovery (PAD)). For example, the candidate device may determine based on a service, service type, or service identifier, that the candidate device desires that a group be persistent. As one example, joining a group may be for the purposes of accessing a service, such as a printing service.

Fourth, the determination regarding which type of group the candidate device would like to join may be triggered based on hardware configuration. The determination may depend on the state of other communications protocols in the candidate device. For example, when associated with a Bluetooth pairing connection, the candidate device may determine that group persistence should be used. As another example, when establishing a connection in response to a near-field communications (NFC) procedure, the candidate device may determine that persistence should not be used.

Fifth, the determination may be location-specific and therefore based on location information such as Global Positioning System signals or data (GPS), a cellular network cell ID or country code, or IEEE 802.11 location information or country code. The candidate device may determine that any group the device joins should or should not be persistent if the user is at a home location, or a location where a previous or alternative determination (e.g. user-provided input) indicated a desire for the use (or desire for no use) of PPGs.

Rules governing one or more of the candidate device's preferences listed above may be described by one or more group persistence policies that are set (i.e., configured) on the candidate device, which may be set by the user, an administrator, or any other third party with rights to do so. Following the determination in block 702, the candidate device may take different actions depending on whether the candidate device has determined that it should connect, or desires to connect, to either a persistent P2P group (PPG) or a non-persistent-P2P group (non-PPG) in block 704. If the candidate device's desire (or requirement, determination, or policy) is for a PPG, the candidate device indicates this request in signaling or communications sent prior to group formation (e.g. by setting the value of the PGI bit to 1 in block 706). The candidate device subsequently proceeds with group discovery using the value of the PGI bit set to 1 in block 706. In block 708, there may be an optional intent level that provides an objective measure of a candidate device's desire or ability to be a GO for a group. A desire to be part of a persistent group results in an increase intent level for that device upon joining a persistent group. If the desire is for a non-PPG, the candidate device sets the value of the PGI bit to 0 as in block 710 and proceeds with group discover. In block 712, the intent level is optionally decreased because the device desires to join a non-persistent network.

Optionally, the communications or signaling for the determination in block 702 may allow for a distinction to be drawn between a device which: 1) desires the use of persistence; 2) desires that persistence not be used; 3) has no preference on whether or not persistence should be used; 4) has a policy to not join (or not remain in) any group unless persistence is enabled; and 5) has a policy to not join (or not remain in) any group unless persistence is disabled. Subsets or supersets of the above scenarios are also possible.

In an alternative embodiment, a device indicating a desire and/or policy to join a group with persistence enabled may, in response to determining that the established group does not use persistence, decline to join the group. Likewise, a device indicating a desire and/or having a policy requirement to join a group with persistence disabled may, in response to determining that the established group does use persistence, decline to join the group. A device sending such an indication may do so prior to the determination of which device becomes the group owner (GO) for the group. In some embodiments, if the device subsequently becomes GO, the device may use the outcome of the determination in block 702 to determine whether persistence should be enabled for the group and may then use this outcome to set a value (e.g. set the value to 1 or 0) of a Persistent Reconnect bit in the Group Capabilities Bitmap field that the device sends describing the P2P group capabilities. The value of the Persistent Reconnect bit may be set to 1 when the P2P device is hosting or intends to host a persistent P2P group that allows reconnection without user intervention. Otherwise, the value of the Persistent Reconnect bit is set to zero.

Figure 8:
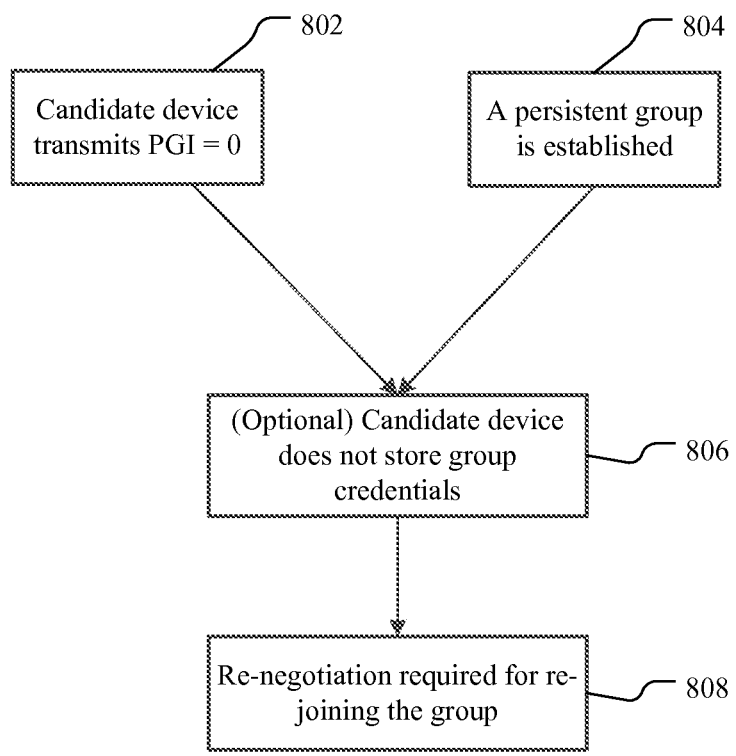
FIG. 8 illustrates a process for handling a device in a persistent group.

FIG. 8 illustrates a process for handling a device in a persistent group. A candidate device may transmit a PGI bit of zero in block 802 which indicates that the candidate device does not desire a persistent group. If a group is established with persistence enabled despite this desire as in bock 804, the device may decide not to store persistent information as in block 806. This may apply in situations where although a device is able to store persistent data, the device does not wish to do so and does not want to join a PPG. In that case, the device may be required to renegotiate when re-joining the same group in the future as in block 808.

Figure 9:
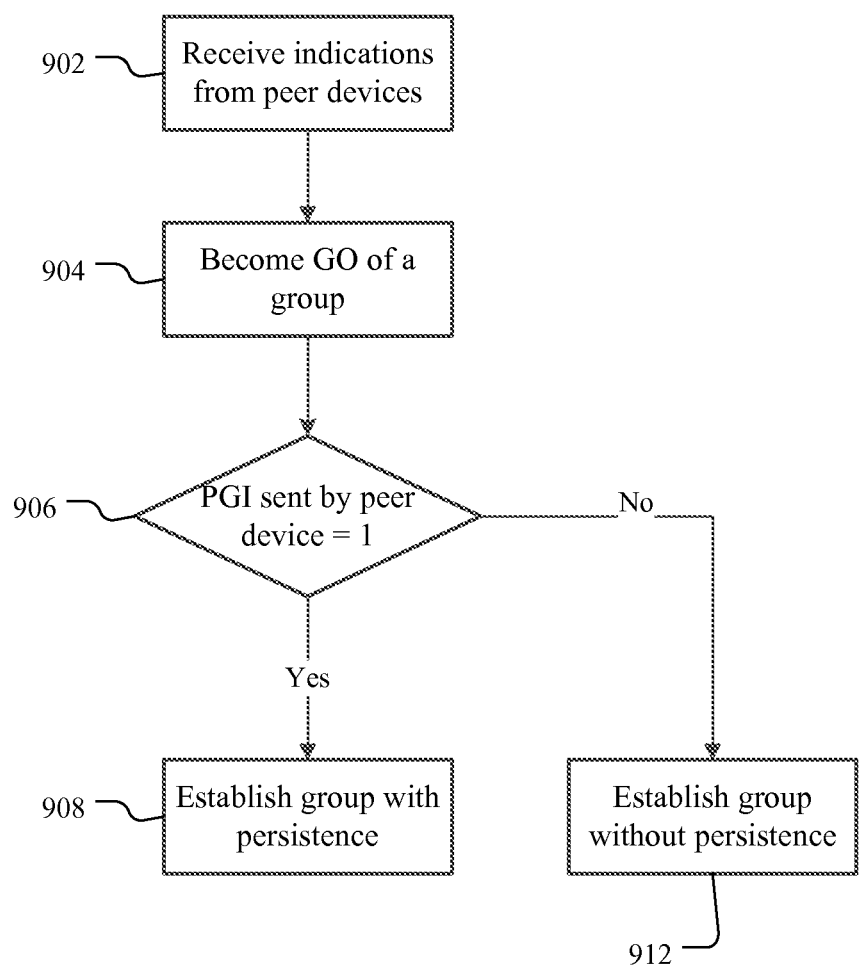
FIG. 9 illustrates a process by which a group owner determines persistence.
Figure 10:
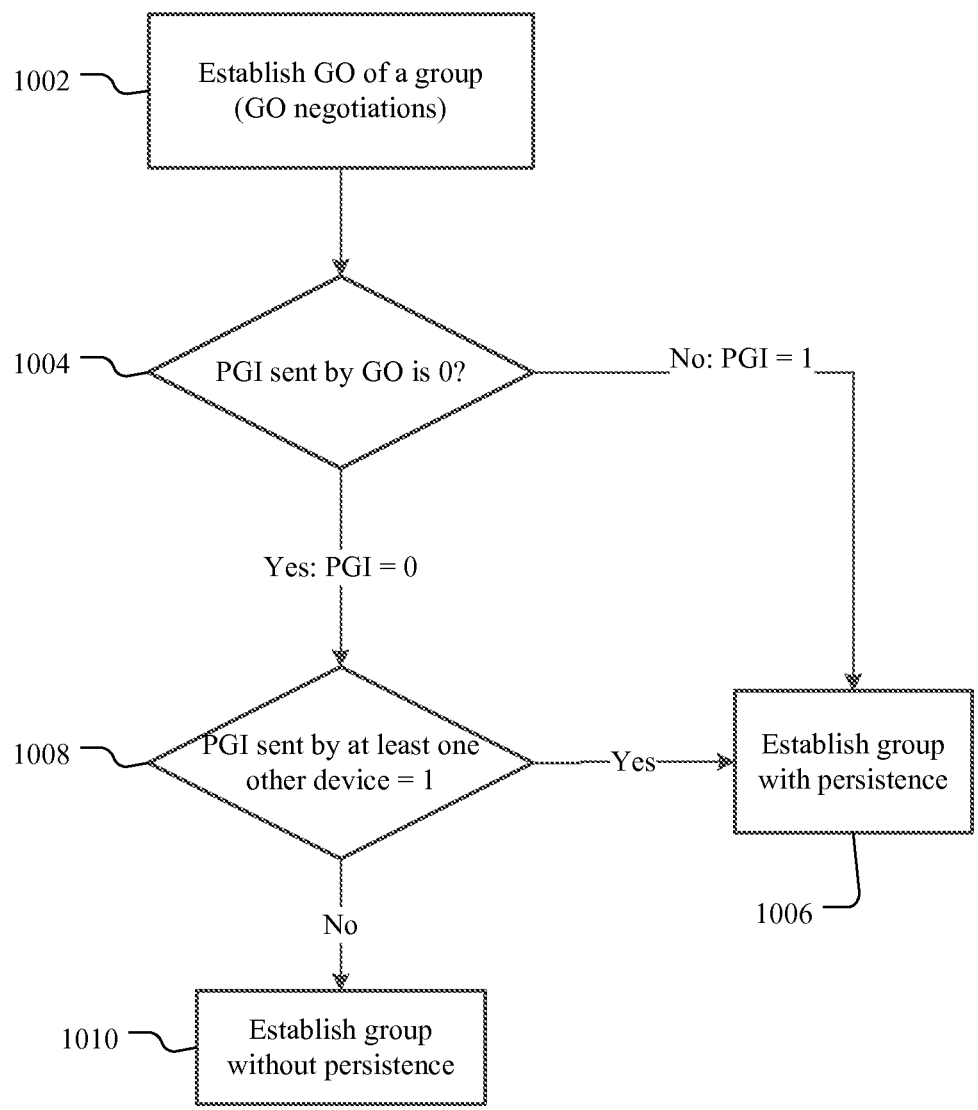
FIG. 10 illustrates a process for by which a group owner decides persistence.

Other embodiments by which a GO determines whether persistence should be enabled are described below. FIG. 9 illustrates a process by which a GO determines persistence. FIG. 10 illustrates a process for by which a GO decides persistence. When a GO establishes a group, there may not be a mechanism available for it to receive an indication from another peer device within that group as to whether the group should be persistent. In such an instance, the GO's autonomous decision to establish a PPG (or to not establish a PPG) may not take into account the preferences/policies of peer devices within the group.

FIG. 9 illustrates a flow chart for a device that subsequently becomes the group owner (GO). Each of the devices in a group may provide an indication in block 902 (e.g. PGI) that allows the GO of the subsequently formed group to determine if that group should be persistent or non-persistent. In block 904, one of the devices of the group becomes the GO (e.g., by means of GO negotiation). In one embodiment, the GO is selected based at least partially on the indications provided in block 902. The GO receives an advertised indication (e.g. a PGI bit) from a candidate device intending (or not intending) to use group persistence in block 906. If the GO received an advertisement from a candidate device, with a value of the PGI bit set to 0, the GO then establishes a group without persistence as in block 910. Conversely if the GO received an advertisement from a candidate device with a value of the PGI bit set to 1, the GO may establish a group with persistence as in block 908.

FIG. 9 illustrates a GO receiving an indication from one device. However, it will be appreciated that a GO may also receive indications from multiple devices and these indications may differ. In such embodiments, the GO may need to determine if the group it creates will have persistence based on a combinatorial rule such as a decision based on what the majority of indications indicate, or a decision based on whether at least one (or at least N) devices have expressed a particular persistence preference. FIG. 10 illustrates such a modified flow chart for a GO.

A device becomes a GO of a new group in block 1002. In becoming GO, the process may for example follow a GO negotiation algorithm or may follow a modified version of this process, or may follow an alternative process. If a group persistence preference (e.g. the PGI bit) within that GO device is set to a value of 1 as in block 1004, the group becomes a PPG in block 1006. In some embodiments, (e.g. if the PGI bit sent by the GO device is set to a value of 0 in block 1004), the GO may then consider the indications of other candidate devices in block 1008 with respect to their intent or desire to connect to a PPG (e.g. whether they are advertising their PGI bits equal 1). The GO may then decide to establish a PPG in block 1006, or a non-persistent group in block 1010 based on any appropriate algorithm taking into account the indications of other devices. In an alternative embodiment, the indications of other devices and its own preference will be used for determining persistence. Additional algorithms or embodiments for determining persistence include: 1) majority voting; 2) a presumption to enable persistence unless all devices indicate a preference otherwise (or no preference); and/or 3) presumption to disable persistence unless all devices indicate a preference otherwise (or no preference). Accordingly, FIG. 10 establishes that the GO can determine persistence based on a number of devices within a group, while FIG. 9 established that a single peer device can be used to determine persistence.

Figure 11:
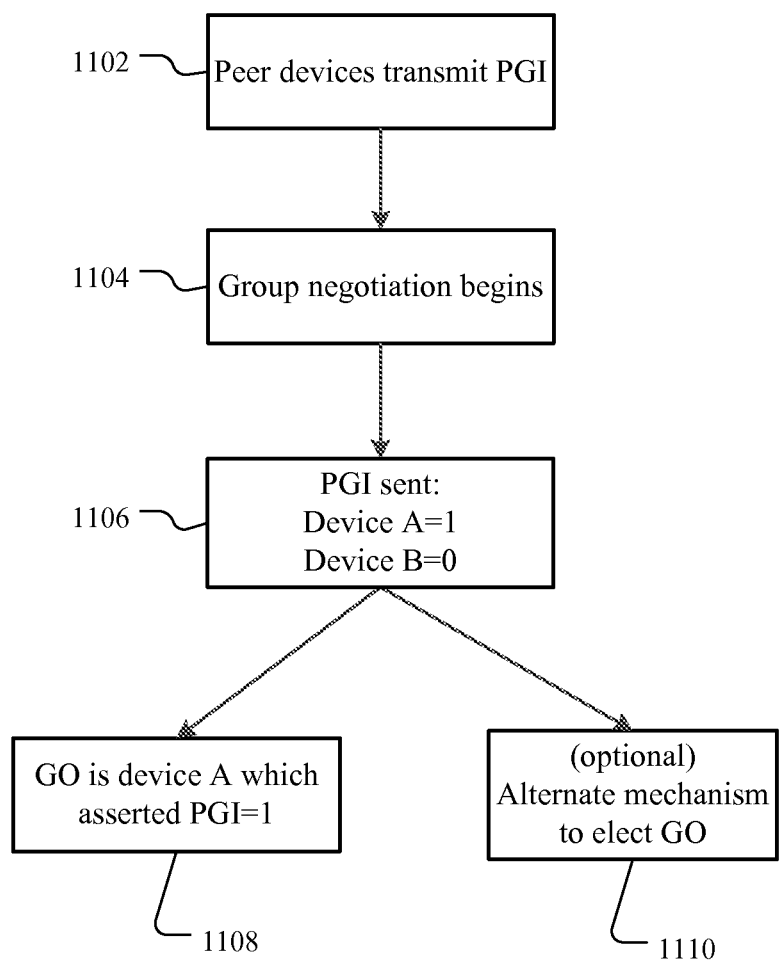
FIG. 11 illustrates a process for determining a group owner.

FIG. 11 illustrates a process for determining a group owner (GO). The determination of a GO may referred to as GO negotiation and may be subject to a GO negotiation algorithm for deciding the GO as discussed below. In block 1102, peer devices transmit PGI values, which are used in the group negotiation in block 1104. In the example shown in FIG. 11 (with two devices, A and B), if one device sets its PGI bit to 1, and the other device sets its PGI bit to 0 in block 1106, the device with PGI=1 is elected as GO as in block 1108. If there is no clear outcome for the GO based on the PGI bit values of candidate devices, an alternative GO election method may be used as in block 1110. Although FIG. 11 illustrates two peer devices, the process may be extended to more than two devices.

For an alternative method in block 1110, the GO may be established based at least partially on GO intent level as discussed above with respect to blocks 1008 and 1012 of FIG. 10. The higher a GO intent level, the more likely a device is to become GO. In one alternative embodiment, a device may set its GO intent level in accordance with its desire to form/join a persistent or non-persistent group (e.g. as determined in block 1002). For example, the device might carry out the following steps: 1) determine a desire to join a persistent or non-persistent group; 2) (optionally) determine a GO intent level according to other inputs (may be unrelated to persistence); 3) if the device desires to join a persistent group, increase the GO intent level; 4) if the device desires to join a non-persistent group, decrease the GO intent level; 5) transmit the GO intent level; and 6) perform GO negotiation based on GO intent level. In some embodiments, the signaled GO intent level may depend on the signaled indication for persistence (e.g. the PGI bit). If different levels of desire are configured (e.g. preference vs. policy), the GO intent level may be modified by multiple different degrees depending on the extent to which the device wishes to join a persistent or non-persistent group. In addition to a GO intent level, there may be a persistence intent level or persistence group intent level that measures a device's desired intent to be part of a persistent group. In one embodiment, the persistence intent level may the same as or similar to the GO intent level in terms of how the intent level is determined. The persistence intent level may be advertised or communicated prior to joining a group and used in GO negotiation.

In an alternative embodiment, the setting of a PGI bit of a device may be used directly within the GO negotiation either instead of, or together with, the transmitted GO intent values. For example, the PGI bit may be used as the basis of a tie-breaker if GO intent levels indicated by two or more peers are equal. In this alternative embodiment, the device may carry out the following steps: 1) determine a desire to join a persistent group; 2) (optionally) determine a GO intent level according to other inputs (may be unrelated to persistence); 3) (optionally) transmit the intent level; 4) transmit an indication of a desire to join a persistent or non-persistent group (i.e. a group persistence preference); and 5) perform GO negotiation based on (at least) the indicated group persistence preference(s) as transmitted by device and peers and (optionally) based on intent levels.

Figure 12:
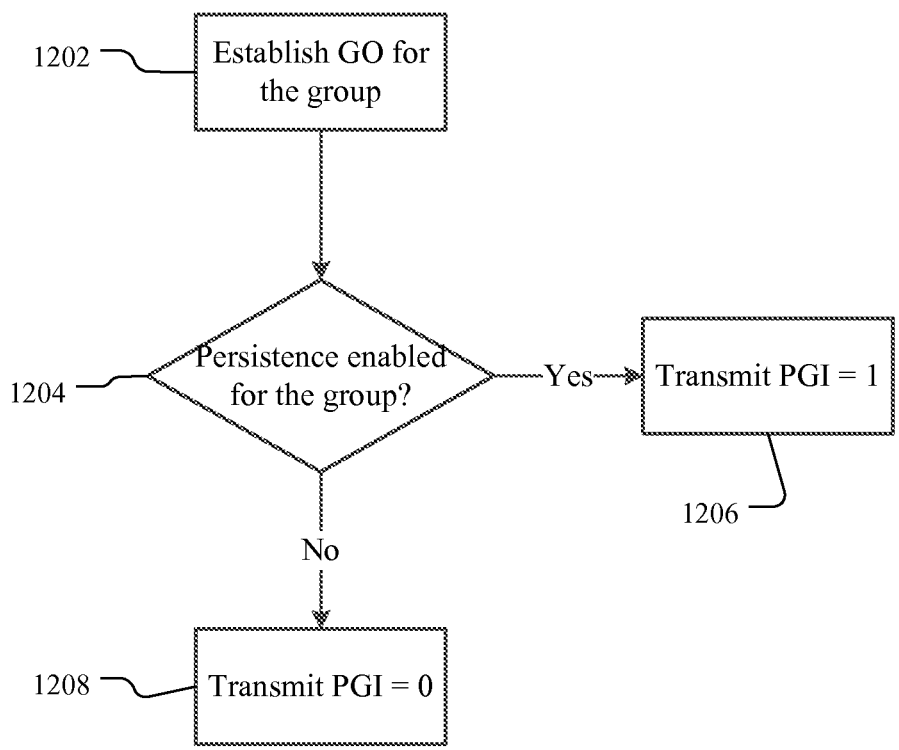
FIG. 12 illustrates a process for advertising whether persistence is enabled for a group.

FIG. 12 illustrates a process for advertising whether persistence is enabled for a group. An indication (e.g., a PGI bit) of group persistence may be advertised, by any group member, to a candidate device prior to a candidate device joining the group. The indication may be similar to the PGI bit that signifies whether or not the established group is a persistent P2P group. Once a device becomes a GO of a new group as in block 1202 the GO determines if persistence is required or enabled for that group in block 1204. This determination may be according to FIG. 9. If the group is persistent, the device may set its PGI bit value to 1 in future discovery advertisements and procedures in block 1206. If the group is not persistent, the device may set its PGI bit value to 0 in future discovery advertisements and procedures in block 1208.

FIG. 2 illustrates an embodiment where the wireless device 102 communicates (pre-joining) with a plurality of groups. The selection of a group by the wireless device may be based on indications advertised from GOs for those groups. The indications may be the PGI bit and may assist a candidate device in deciding which group to connect with. In some embodiments, the device may, in response to receiving the indication(s) corresponding to the respective group(s), determine to not join any group. This may optionally include a step similar block 702 of FIG. 7 wherein the device determines its preference for joining a persistent group.

Figure 13:
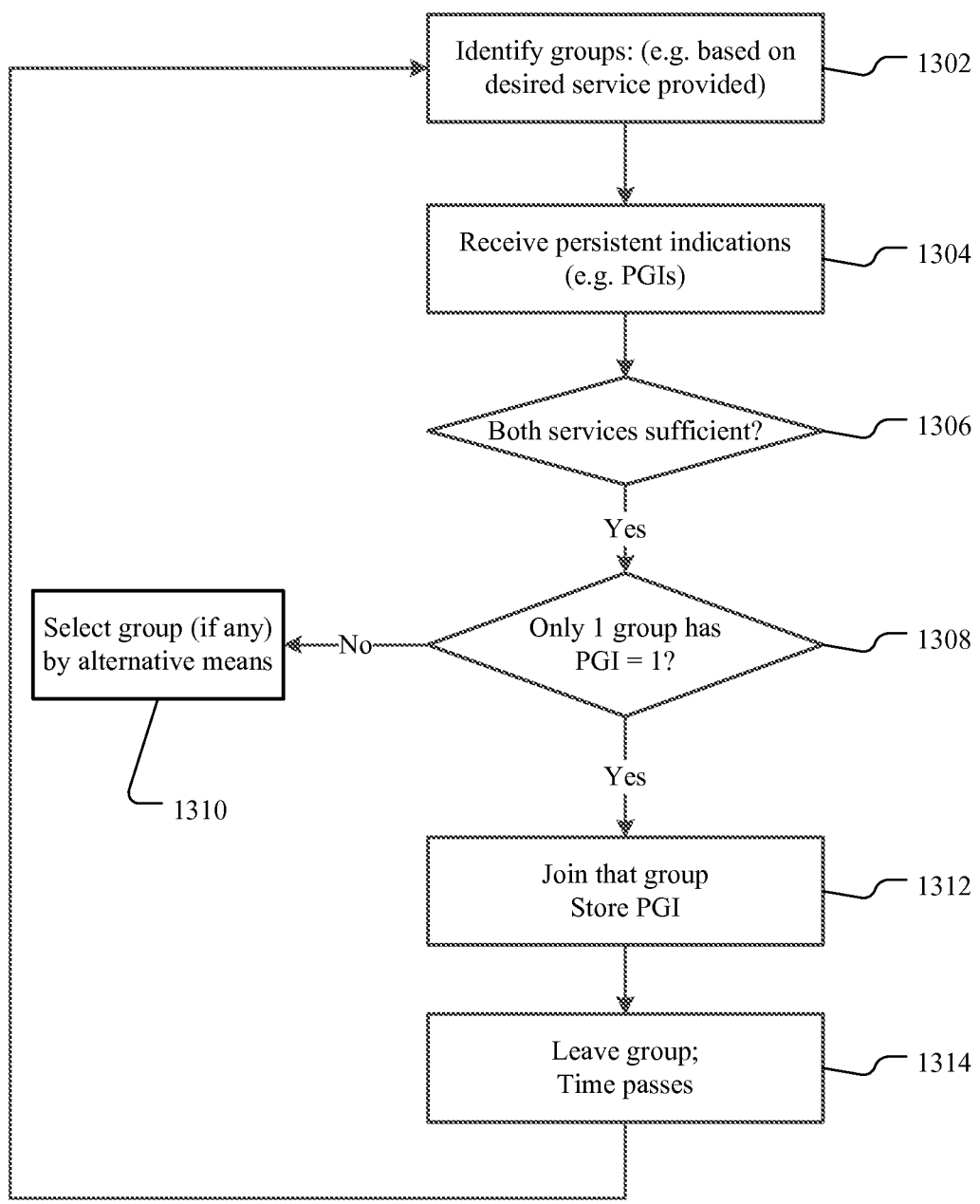
FIG. 13 illustrates a process for a wireless device discovering P2P groups.

FIG. 13 illustrates a process for a wireless device discovering P2P groups. The wireless device is a candidate device 202 identifying which group to join. The device may attempt to join a group to determine which, if any, detected groups are using persistence, and (optionally) to select a group (or to select no group) from amongst those discovered based on the determined information. In block 1302, the device detects (e.g. by means of discovery mechanisms) the existence of two or more groups that provide one or more services of interest to the device. Devices (such as the GO) within each group advertise whether persistence is in use in that group (such as by means of transmitting a specific value of the PGI bit), and these indications of persistence are received by the candidate device in block 1304. In block 1306, the device may evaluate the services available in each group. If the device determines that acceptable (or desirable) services are available in more than one group in block 1308, then the device selects and attempts to join (one of) the group(s) for which persistence is enabled as in block 1312.

If no group explicitly indicates the use of persistence, the device may select a group for which no explicit indication is given. Similarly, if the device determined that it should join a group which does not use persistence, the selection may be made by prioritizing those groups where persistence is indicated explicitly as not being in use. For example, groups may be prioritized as: 1) groups where persistence is explicitly indicated as being in use; 2) groups where no explicit indication is made; and 3) groups where persistence is indicated explicitly as not being in use. If the device subsequently leaves (e.g. disconnects from, or is disconnected from) a PPG to which it previously was connected in block 1314, it may reconnect after some time passes. If neither group advertises persistent storage, then the candidate device may use an alternate means (e.g. a random tie break) to determine which of the groups to connect with (if any) as in block 1310.

The systems and methods described above may be modified for backwards compatibility with legacy devices. Legacy devices may automatically set any previously undefined or reserved bits as zero. There may need to be an additional indication (e.g. 1 bit) that indicates that persistence is set in another bit (PGI bit). For example, there may be a total of 2 bits that are employed that include a "PGI bit valid" indication which is set to 1 by a device supporting the PGI bit. The second bit would be the indication itself (i.e. the PGI bit). Effectively the "PGI bit valid" bit is an indication of a device's capability to support PGI signaling and the pre joining communications discussed above. A device supporting PGI may indicate that the PGI bit is not valid if it has no preference regarding whether persistence is enabled for the group. Similarly, for an established group, a legacy device in the group will indicate "PGI bit valid=0," while a device supporting the feature indicates "PGI bit valid=1." This may avoid ambiguity as to whether the device is a legacy device not supporting the new PGI bit, or a supporting device indicating that persistence is not desired (or is not in use in an existing group).

The embodiments described above may allow a wireless device to determine and indicate whether it prefers to join a group for which persistence is enabled or to join a group for which persistence is disabled, prior to group formation. The embodiments described may further allow a group owner (GO) to take into account the desires/preferences/policies of its peers when establishing a group, specifically with regards to determining whether or not to enable persistence in the group. This avoids the GO storing credentials for devices which do not wish to use persistence (and may therefore discard the group credentials on leaving the group). Similarly, it may avoid the creation (or joining) of a group which does/does-not use persistence in contradiction to a member device's desire/policy and the subsequent departure of that device, resulting in wasted signaling and battery consumption. Other embodiments may enhance the GO negotiation process so that it is more likely that a device wishing to enable persistence becomes GO, which avoids a device which does not wish to use persistence from being expected/requested by its peers to enable persistence for the group. Other embodiments may allow a device to determine whether persistence is used in an existing group, prior to joining that group which further allows a device i) to determine whether or not to join a group, and/or ii) to preferentially select a group operating in line with its preferences/policy.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method in a wireless device, the method comprising:
receiving, prior to determining whether to join a peer-to-peer (P2P) group, persistence information for the P2P group, wherein the persistent information comprises a persistent group intent (PGI) bit indicating a persistency of the P2P group; and
determining whether to join the P2P group based on the persistent information for the P2P group.

2. The method of claim 1 wherein the PGI bit is set to zero when the P2P group is not persistent and set to one when the P2P group is persistent.

3. The method of claim 1 wherein the persistence information is advertised by the P2P group.

4. The method of claim 3 further comprising:
joining the P2P group based on the persistent information advertised by the P2P group.

5. The method of claim 4 wherein the wireless device desires to join a non-persistent group, further wherein the P2P group advertises that it is not persistent.

6. The method of claim 4 wherein the wireless device desires to join a persistent group, further wherein the P2P group advertises that it is persistent.

7. The method of claim 6 wherein the wireless device utilizes previously saved group information for the P2P group when joining the P2P group.

8. A wireless device, the device comprising:
a processor configured to:
establish whether a persistent connection is desired for a connection between the wireless device and a peer-to-peer (P2P) group; and
receive, prior to joining the P2P group, an advertisement from the P2P group, wherein the advertisement comprises a persistent group intent (PGI) bit indicating whether the P2P group provides the persistent connection.

9. The device of claim 8 wherein the wireless device does not join the P2P group when the advertisement of the persistent connection from the P2P group does not match the persistent connection for the wireless device.

10. The device of claim 9 wherein the processor is further configured to:
discover, prior to joining a P2P group, available P2P groups that match the persistent connection.

11. The device of claim 10 wherein the processor is further configured to:
associate with one of the available P2P groups that match the desired persistent connection.

12. The device of claim 8 wherein the wireless device either desires the persistent connection or a non-persistent connection, and the advertisement from the P2P group indicates either the persistent connection or a non-persistent connection.

13. A method for a peer-to-peer (P2P) network, the method comprising:
establishing a persistent group intent value for the P2P network, wherein the persistent group intent value comprises a persistent group intent (PGI) bit that signifies whether the P2P network is persistent; and
advertising to a candidate device, prior to the candidate device joining the network, the persistent group intent value.

14. The method of claim 13 wherein the PGI bit indicates either a persistent group or a non-persistent group.

15. A method in a wireless device, the method comprising:
sending, prior to formation of a peer-to-peer (P2P) group, a first persistent group intent (PGI) bit corresponding to a first intent to form a persistent P2P group;
receiving, prior to formation of a peer-to-peer (P2P) group, a second persistent group intent (PGI) bit corresponding to a second intent to form the persistent P2P group from one or more peers; and
forming the persistent P2P group.

16. The method of claim 15 further comprising:
determining based on the first PGI bit and the second PGI bit whether the group formed is persistent or not.

17. A wireless device, the device comprising:
a processor configured to:
communicate, prior to forming a peer-to-peer (P2P) group, an indication of desired persistency for a group, wherein the indication comprises a persistent group intent (PGI) bit associated with the desired persistency for the group; and
form the P2P group.

18. The wireless device of claim 17 wherein the communication comprises:
sending the indication of the desired persistency to a peer device; and
receiving, from the peer device, a second indication of the desired persistency from the peer device.

* * * * *